(12) United States Patent
Jiang et al.

(10) Patent No.: US 10,110,662 B2
(45) Date of Patent: Oct. 23, 2018

(54) METHOD AND APPARATUS FOR SENDING DATA IN VDI ENVIRONMENT

(71) Applicant: Huawei Technologies Co., Ltd., Shenzhen (CN)

(72) Inventors: Zhimin Jiang, Shenzhen (CN); Xibao Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 15/192,336

(22) Filed: Jun. 24, 2016

(65) Prior Publication Data

US 2016/0308951 A1 Oct. 20, 2016

Related U.S. Application Data

(63) Continuation of application No. PCT/CN2014/086472, filed on Sep. 15, 2014.

(30) Foreign Application Priority Data

Dec. 26, 2013 (CN) .......................... 2013 1 0733699

(51) Int. Cl.
*G06F 9/455* (2018.01)
*H04L 29/06* (2006.01)
(Continued)

(52) U.S. Cl.
CPC .......... *H04L 67/08* (2013.01); *G06F 9/45558* (2013.01); *H04L 67/42* (2013.01); *H04L 69/40* (2013.01); *G06F 2009/45595* (2013.01)

(58) Field of Classification Search
None
See application file for complete search history.

(56) References Cited

U.S. PATENT DOCUMENTS 8,065,676 B1 11/2011 Sahai et al.
2004/0179036 A1* 9/2004 Teplov .................. G06F 3/1454
715/751

(Continued)

FOREIGN PATENT DOCUMENTS

CN 102131236 A 7/2011
CN 102141930 A 8/2011
(Continued)

OTHER PUBLICATIONS

Partial English Translation and Abstract of Chinese Patent Application No. CN103701807, Jul. 5, 2016, 3 pages.
(Continued)

*Primary Examiner* — Brian Whipple
(74) *Attorney, Agent, or Firm* — Conley Rose, P.C.

(57) ABSTRACT

A method and an apparatus for sending data in a visual desktop infrastructure (VDI) environment, where the method includes, when a desktop protocol client is in an abnormal state, a desktop protocol server sending desktop image data to the desktop protocol client at a rate lower than a rate used when the desktop protocol client is in a normal state, and when the desktop protocol client is in an abnormal state, the desktop protocol server still sends desktop image data to the desktop protocol client, when the desktop protocol client resumes to a normal state, the amount of data that needs to be sent by the desktop protocol server is greatly reduced as compared with the prior art, therefore, occupied network bandwidth is reduced, and a display delay is reduced, thereby improving user experience.

21 Claims, 7 Drawing Sheets

(51) Int. Cl.
*H04L 29/08* (2006.01)
*H04L 29/14* (2006.01)

(56) References Cited

U.S. PATENT DOCUMENTS

| | | | |
|---|---|---|---|
| 2004/0181577 A1* | 9/2004 | Skurikhin | G06Q 10/10 709/204 |
| 2004/0181579 A1* | 9/2004 | Huck | G06Q 10/10 709/205 |
| 2008/0250107 A1* | 10/2008 | Holzer | H04L 12/1831 709/206 |
| 2011/0055602 A1 | 3/2011 | Kamay et al. | |
| 2011/0227934 A1 | 9/2011 | Sharp | |
| 2012/0011445 A1 | 1/2012 | Gilboa | |
| 2012/0151360 A1 | 6/2012 | Molander et al. | |
| 2012/0166585 A1 | 6/2012 | Kim et al. | |
| 2012/0331406 A1 | 12/2012 | Baird et al. | |
| 2014/0156778 A1* | 6/2014 | Luxenberg | H04L 67/2842 709/213 |
| 2014/0188982 A1* | 7/2014 | Chen | H04L 67/2842 709/203 |

FOREIGN PATENT DOCUMENTS

| | | | |
|---|---|---|---|
| CN | 102404343 A | 4/2012 | |
| CN | 102413150 A | 4/2012 | |
| CN | 103701807 A | 4/2014 | |
| EP | 1043655 A2 | 10/2000 | |

OTHER PUBLICATIONS

Bo, L., "Design and Implementation of Virtual Desktop Client Based on SPICE Protocol," Part 1, 2012, 35 pages.

Bo, L., "Design and Implementation of Virtual Desktop Client Based on SPICE Protocol," Part 2, 2012, 43 pages.

Li, X., et al., "Study on the Improvement Technology of Virtual Desktop Infrastructure for Quality of User Experience," Feb. 2013, 87 pages.

Hwang, J.,e t al., "Adaptive Dynamic Priority Scheduling for Virtual Desktop Infrastructures," International Workshop on Quality of Service, Jun. 4, 2012, 9 pages.

Foreign Communication From a Counterpart Application, European Application No. 14873297.7, Extended European Search Report dated Oct. 5, 2016, 11 pages.

Foreign Communication From a Counterpart Application, PCT Application No. PCT/CN2014/086472, English Translation of International Search Report dated Dec. 5, 2014, 2 pages.

Foreign Communication From a Counterpart Application, PCT Application No. PCT/CN2014/086472, English Translation of Written Opinion dated Dec. 6, 2014, 6 pages.

* cited by examiner

METHOD AND APPARATUS FOR SENDING DATA IN VDI ENVIRONMENT

CROSS-REFERENCE TO RELATED APPLICATIONS

This application is a continuation of International Application No. PCT/CN2014/086472, filed on Sep. 15, 2014, which claims priority to Chinese Patent Application No. 201310733699.8, filed on Dec. 26, 2013, both of which are hereby incorporated by reference in their entireties.

TECHNICAL FIELD

The present disclosure relates to the field of virtualization technologies, and in particular, to a method and an apparatus for sending data in a visual desktop infrastructure (VDI) environment.

BACKGROUND

VDI is a popular technology in the current enterprise office environment, in which not each user is provided with a desktop personal computer running an operating system (for example, WINDOWS XP or WINDOWS VISTA), but instead, a desktop of a user is virtualized by running an operating system on a remote server. Simply speaking, content displayed on one computer screen is transferred to another screen for display. Therefore, in a scenario of a virtual desktop, there should be at least a server and a terminal device (for example, a client or a personal computer), and a plurality of virtual machines run on the server such that each user can connect to a virtual machine in the server in a one-to-one manner using a virtual desktop client (briefly referred to as a client below) installed on the terminal device. In this case, content displayed by the client is display content of the virtual machine, and the user can access the virtual machine by operating the content displayed by the client.

After the client is connected to the virtual machine on the server, the virtual machine sends image data to the client such that the image data is displayed on the client. When the client is minimized, hidden, or screen locked, the client does not actually operate the virtual machine on the server. To reduce resources of the server that are occupied by the virtual machine in this case, and improve utilization of resources of the server, the prior art provides a solution. FIG. 1 is a schematic diagram of implementation when a client is minimized in a VDI environment according to the prior art. When a client is minimized, the client sends a related notification to a server, and the server stops sending image data to the client. When the client resumes display, the client also sends a related notification to the server, and the server resumes sending image data to the client for display.

According to the foregoing solution, when the client is minimized, hidden, or screen locked, the resources of the server that are occupied by the virtual machine can be reduced, and the utilization of the resources of the server can be improved. However, when the client resumes display, the server needs to send a large amount of image data to the client again. On one hand, burst network resource occupation is caused, on the other hand, because the client needs to receive a large amount of image data, a delay occurs when display is resumed, resulting in relatively poor user experience.

SUMMARY

Embodiments of the present disclosure provide a method and an apparatus for sending data in a VDI environment, which are used to resolve problems in the prior art that to reduce resources of a server that are occupied by a virtual machine, large network bandwidth needs to be occupied when a client resumes display, and a display delay results in relatively poor user experience.

The following technical solutions are used in the embodiments of the present disclosure.

A first aspect provides a method for sending data in a VDI environment, including sending, by the desktop protocol server, desktop image data acquired after the first notification message is received to the desktop protocol client at a first rate when a desktop protocol server receives a first notification message used for indicating that a desktop protocol client is in an abnormal state, where the abnormal state is a state in which the desktop protocol client does not operate, within a preset first time length, a terminal desktop on which the desktop protocol client is located, and sending, by the desktop protocol server, desktop image data acquired after the second notification message is received to the desktop protocol client at a second rate greater than the first rate when the desktop protocol server receives a second notification message used for indicating that the desktop protocol client is in a normal state, where the normal state is a state in which the desktop protocol client operates, within a preset second time length, the terminal desktop on which the desktop protocol client is located.

With reference to the first aspect, in a first possible implementation manner, the desktop image data is non-three dimensional (3D) image data, and after receiving the first notification message, the desktop protocol server acquires the desktop image data in the manner of acquiring, by the desktop protocol server, the desktop image data using a graphics device interface (GDI) subsystem.

With reference to the first aspect, in a second possible implementation manner, the desktop image data is 3D image data, and after receiving the first notification message, the desktop protocol server acquires the desktop image data in the manner of setting, by the desktop protocol server, a current rendering frame rate to a first frame rate, where the first frame rate is less than a second frame rate used when the second notification message is received, acquiring a 3D rendering instruction according to the first frame rate, and redirecting the 3D rendering instruction to a render server for rendering, to obtain rendered desktop image data.

With reference to the first aspect, in a third possible implementation manner, the desktop image data is 3D image data, and after receiving the second notification message, the desktop protocol server acquires the desktop image data in the manner of setting, by the desktop protocol server, a current rendering frame rate to a second frame rate, where the second frame rate is greater than a first frame rate used when the first notification message is received, acquiring a 3D rendering instruction according to the second frame rate, and redirecting the 3D rendering instruction to a render server for rendering, to obtain rendered desktop image data.

With reference to the first aspect, the first possible implementation manner of the first aspect, the second possible implementation manner of the first aspect, or the third possible implementation manner of the first aspect, in a fourth possible implementation manner, the abnormal state includes a minimized state, a hidden state, or a screen locked state.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, in the VDI environment, the desktop protocol client is located in a virtual desktop client, and the desktop protocol server is located on a virtual machine in a virtual desktop server, where the desktop protocol server sends the acquired desktop image data to the desktop protocol client in the virtual desktop client using an operating system in the virtual machine and a physical network interface card in the virtual desktop server.

A second aspect provides an apparatus for sending data in a visual desktop infrastructure VDI environment, where the apparatus is used as a desktop protocol server, and includes a first sending unit configured to send desktop image data acquired after the first notification message is received to the desktop protocol client at a first rate when a first notification message used for indicating that a desktop protocol client is in an abnormal state is received, where the abnormal state is a state in which the desktop protocol client does not operate, within a preset first time length, a terminal desktop on which the desktop protocol client is located, and a second sending unit configured to send desktop image data acquired after the second notification message is received to the desktop protocol client at a second rate greater than the first rate when a second notification message used for indicating that the desktop protocol client is in a normal state is received, where the normal state is a state in which the desktop protocol client operates, within a preset second time length, the terminal desktop on which the desktop protocol client is located.

With reference to the second aspect, in a first possible implementation manner of the second aspect, the desktop image data is non-3D image data, and the apparatus further includes a first desktop image data acquiring unit configured to acquire the desktop image data using a GDI subsystem after the first notification message is received.

With reference to the second aspect, in a second possible implementation manner of the second aspect, the desktop image data is 3D image data, and the apparatus further includes a second desktop image data acquiring unit configured to set a current rendering frame rate to a first frame rate after the first notification message is received, where the first frame rate is less than a second frame rate used when the second notification message is received, acquire a 3D rendering instruction according to the first frame rate, and redirect the 3D rendering instruction to a render server for rendering, to obtain rendered desktop image data.

With reference to the second aspect, in a third possible implementation manner of the second aspect, the desktop image data is 3D image data, and the apparatus further includes a third desktop image data acquiring unit configured to set a current rendering frame rate to a second frame rate after the second notification message is received, where the second frame rate is greater than a first frame rate used when the first notification message is received, acquire a 3D rendering instruction according to the second frame rate, and redirect the 3D rendering instruction to a render server for rendering, to obtain rendered desktop image data.

With reference to the second aspect, the first possible implementation manner of the second aspect, the second possible implementation manner of the second aspect, or the third possible implementation manner of the second aspect, in a fourth possible implementation manner, the abnormal state includes a minimized state, a hidden state, or a screen locked state.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, in the VDI environment, the desktop protocol client is located in a virtual desktop client, and the desktop protocol server is located on a virtual machine in a virtual desktop server, where the desktop protocol server sends the acquired desktop image data to the desktop protocol client in the virtual desktop client using an operating system in the virtual machine and a physical network interface card in the virtual desktop server.

In the embodiments of the present disclosure, when a desktop protocol client is in an abnormal state, a desktop protocol server sends desktop image data to the desktop protocol client at a rate lower than a rate used when the desktop protocol client is in a normal state. On one hand, because the sending rate is reduced, some system resources can be saved, and resources of a server that are occupied by a virtual machine in this case can be reduced, on the other hand, because when the desktop protocol client is in an abnormal state, the desktop protocol server still sends desktop image data to the desktop protocol client, when the desktop protocol client resumes to a normal state, the amount of data that needs to be sent by the desktop protocol server is greatly reduced as compared with the prior art, and therefore, occupied network bandwidth is reduced, and a display delay can be reduced, thereby improving user experience.

DESCRIPTION OF EMBODIMENTS

To resolve problems in the prior art that to reduce resources of a server that are occupied by a virtual machine, large network bandwidth needs to be occupied when a client resumes display, and a display delay results in relatively poor user experience, embodiments of the present disclosure provide a method and an apparatus for sending data in a VDI environment. In the technical solutions, when a desktop protocol client is in an abnormal state, a desktop protocol server sends desktop image data to the desktop protocol client at a rate lower than a rate used when the desktop protocol client is in a normal state. On one hand, because the sending rate is reduced, some system resources can be saved, and resources of a server that are occupied by a virtual machine in this case can be reduced. On the other hand, because when the desktop protocol client is in an abnormal state, the desktop protocol server still sends desktop image data to the desktop protocol client, when the desktop protocol client resumes to a normal state, the amount of data that needs to be sent by the desktop protocol server is greatly reduced as compared with the prior art, and therefore, occupied network bandwidth is reduced, and a display delay can be reduced, thereby improving user experience.

The following describes, in detail with reference to the accompany drawings, the main implementation principle of the technical solutions, specific implementation manners, and corresponding beneficial effects that can be achieved in the embodiments of the present disclosure.

Figure 1:
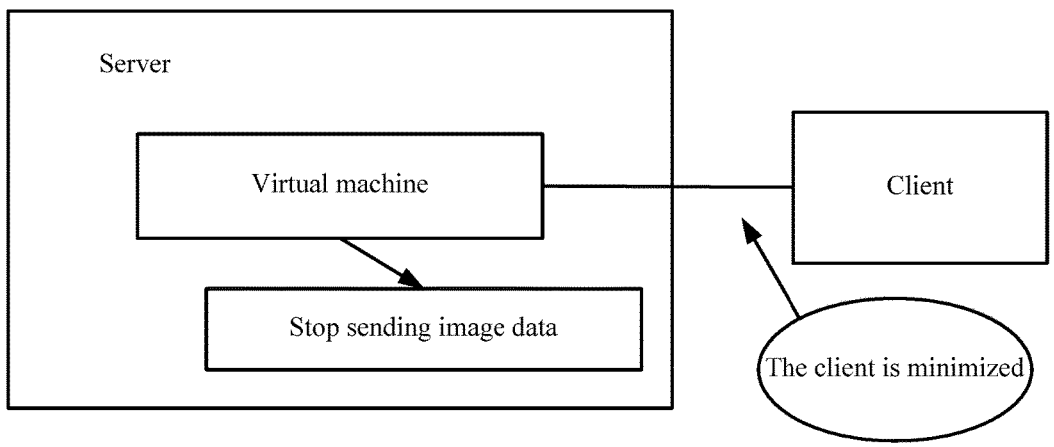
FIG. 1 is a schematic diagram of implementation when a client is minimized in a VDI environment.
Figure 2:
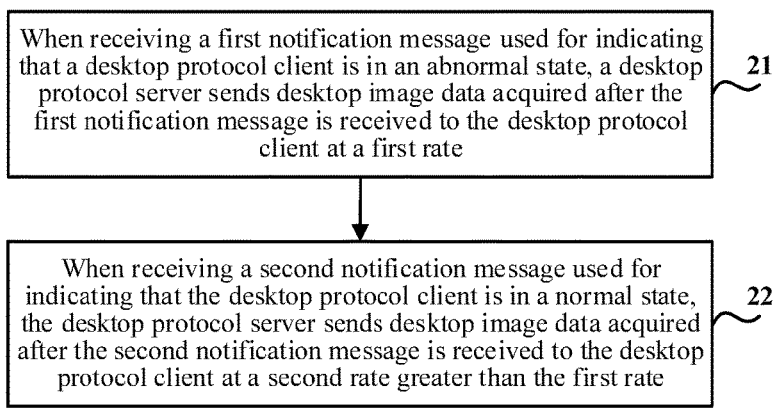
FIG. 2 is a flowchart of a method for sending data in a VDI environment according to an embodiment of the present disclosure.

An embodiment of the present disclosure provides a method for sending data in a VDI environment. FIG. 2 is a flowchart of the method, which further includes the following steps.

Step 21: When receiving a first notification message used for indicating that a desktop protocol client is in an abnormal state, a desktop protocol server sends desktop image data acquired after the first notification message is received to the desktop protocol client at a first rate.

The abnormal state is a state in which the desktop protocol client does not operate, within a preset first time length, a terminal desktop on which the desktop protocol client is located. Further, the abnormal state may be any one of a minimized state, a hidden state, and a screen locked state.

Step 22: When receiving a second notification message used for indicating that the desktop protocol client is in a normal state, the desktop protocol server sends desktop image data acquired after the second notification message is received to the desktop protocol client at a second rate greater than the first rate.

When desktop image data is non-3D image data, after a desktop protocol client is connected to a server (for example, a desktop protocol server), a remote desktop protocol (RDP) service program in a virtual machine acquires image and instruction data of a user virtual machine desktop, performs operations such as image identification, cache calculation, and instruction integration, on the image and instruction data of the user virtual machine desktop, to obtain desktop image data, and sends the obtained desktop image data to the desktop protocol client at a second rate. After a first notification message sent by the desktop protocol client is received, obtained desktop image data is sent to the desktop protocol client at a first rate lower than the second rate in order to release some system resources, and reduce resources of a server that are occupied by the virtual machine.

To further reduce the resources of the server that are occupied by the virtual machine, after the first notification message sent by the desktop protocol client is received, the desktop protocol service program does not perform operations such as image identification, cache calculation, and instruction integration, instead processing for desktop image data is taken over by a GDI subsystem, thereby reducing occupied system resources. The GDI subsystem is a subsystem in a MICROSOFT WINDOWS operating system of the virtual machine, and is mainly responsible for information exchange between the system and a drawing program, and processing graphic outputs of all MICROSOFT WINDOWS programs.

When desktop image data is 3D image data, when the first notification message is received, first, a current rendering frame rate is set to a first frame rate, where the first frame rate needs to be less than a second frame rate used when the second notification message is received, then a 3D rendering instruction is acquired according to the set first frame rate, and the 3D rendering instruction is redirected to a render server for rendering, where a result after the rendering is desktop image data to be sent to the client. When a second notification message is received, a current rendering frame rate is set to the second frame rate, where the second frame rate needs to be greater than the first frame rate used when the first notification message is received, then a 3D rendering instruction is acquired according to the set second frame rate, and the 3D rendering instruction is redirected to the render server for rendering, where a result after rendering is desktop image data to be sent to the client.

A value of a rendering frame rate affects a speed of acquiring a 3D rendering instruction, where when the rendering frame rate is relatively small, the speed of acquiring a 3D rendering instruction is accordingly slow, and a quantity of 3D rendering instructions redirected to the render server for rendering is accordingly reduced such that occupied processing resources of a graphics processing unit (GPU) in the render server can be reduced.

In this embodiment of the present disclosure, when a desktop protocol client is in an abnormal state, a desktop protocol server sends desktop image data to the desktop protocol client at a rate lower than a rate used when the desktop protocol client is in a normal state. On one hand, because the sending rate is reduced, some system resources can be saved, and resources of a server that are occupied by a virtual machine in this case can be reduced. On the other hand, because when the desktop protocol client is in an abnormal state, the desktop protocol server still sends desktop image data to the desktop protocol client, when the desktop protocol client resumes to a normal state, the amount of data that needs to be sent by the desktop protocol server is greatly reduced as compared with the prior art, and therefore, occupied network bandwidth is reduced, and a display delay can be reduced, thereby improving user experience.

The solutions provided in the embodiments of the present disclosure are introduced in detail according to the foregoing implementation principle.

Figure 3:
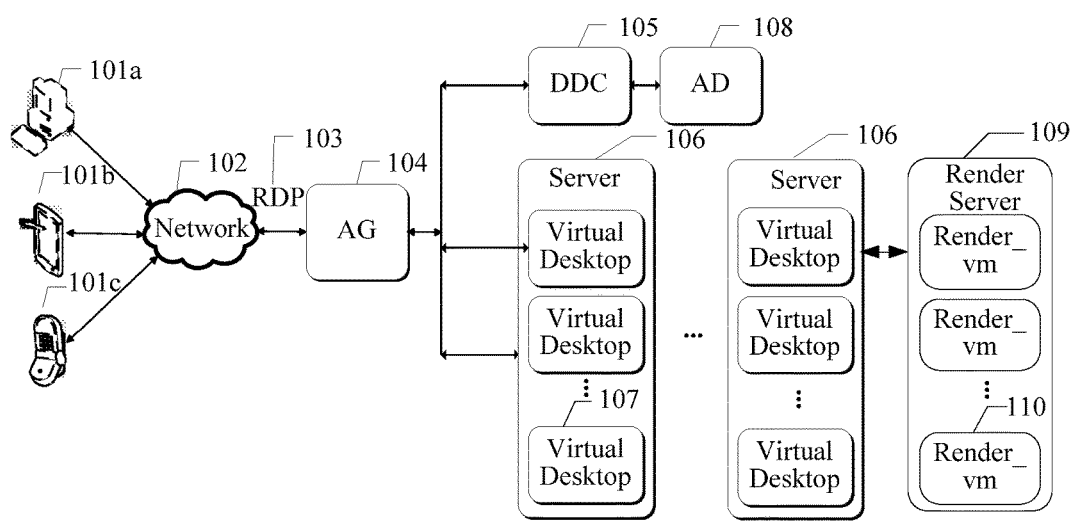
FIG. 3 is a typical architectural diagram of VDI according to an embodiment of the present disclosure.

FIG. 3 is a typical architectural diagram of VDI according to an embodiment of the present disclosure. The left side shows a client that displays a virtual desktop, and is generally referred to as a thin client (TC), and a carrier form thereof may be an ordinary computer 101*a*, a tablet computer 101*b*, a smart phone 101*c*, or the like. They access a server through a network 102 using an RDP (notice: it does not refer in particular to the RDP protocol of Microsoft Corporation) 103. An access gateway (AG) 104 is used as an interface for the server to transmit desktop image data to the client, and is responsible for access to internal network of the server. In a typical scenario, the server includes a desktop delivery controller (DDC) 105, a remote desktop server (RDS) 106, and an activity directory (AD) 108. The DDC 105 is responsible for functions such as user authentication and virtual machine allocation, and identifies a user using information of user account stored in the AD 108. The RDS 106 provides a carrier of a virtual desktop (VD), and a desktop system of a user exists on the RDS 106 in a software form of a virtual machine (VM) 107. A render server (RS) 109 provides a shared rendering platform of a graphic VM to a user having a requirement of high-definition graphics, and a render process (Render_vm) 110 provides redirecting and rendering of a 3D hardware capability to a 3D application.

Figure 4:
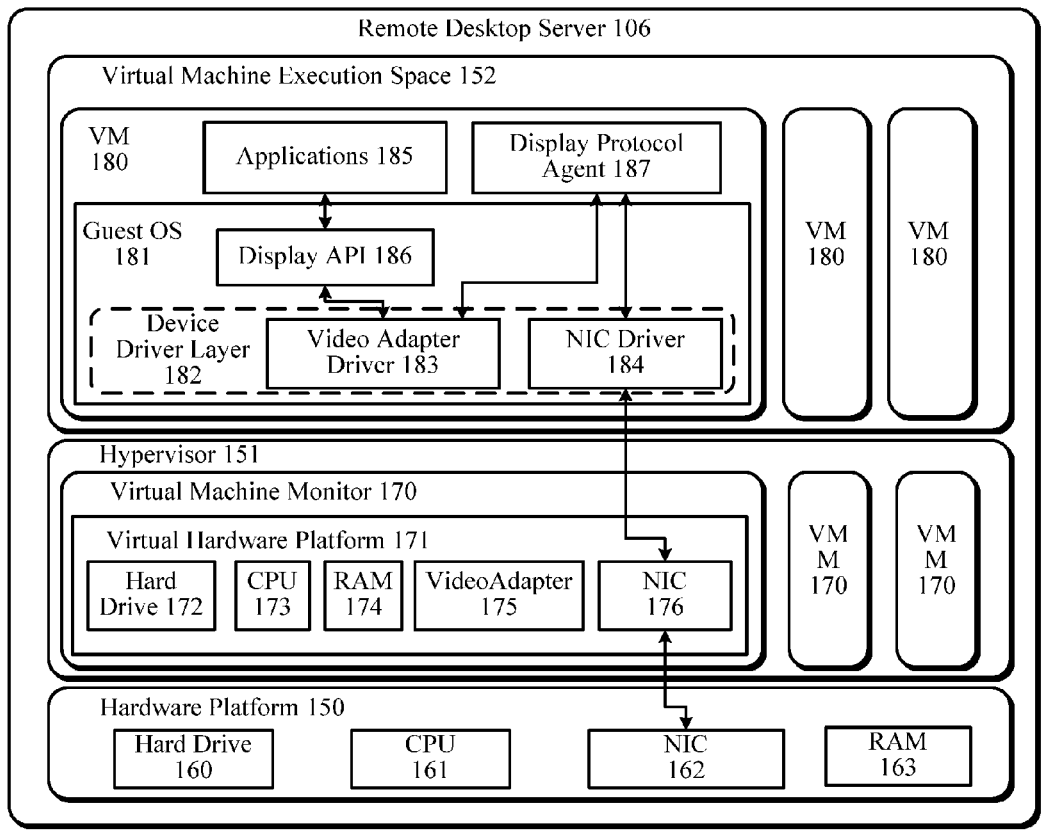
FIG. 4 is a typical architectural diagram of a remote desktop server according to an embodiment of the present disclosure.

A hardware structure and software structure of the RDS 106 are most important components in a remote desktop system, and a typical structure of the RDS 106 is shown in FIG. 4. The RDS 106 consists of three parts, which are a hardware platform 150, a hypervisor 151, and a VM execution space 152. The hardware platform 150 includes a physical hard drive 160, a physical processor (for example, central processing unit (CPU)) 161, a physical network interface card (NIC) 162, and physical memory (for example, random access memory (RAM)) 163 that are in the physical structure of the server. The hypervisor 151 and the VM execution space 152 respectively provide a hardware platform and a software platform for VMs. The hypervisor 151 is an intermediate layer between physical hardware and the VMs, is responsible for coordinating access of the VMs to the physical hardware of the server, and includes multiple virtual machine monitors (VMM) 170, where each of the virtual machine monitors 170 includes a virtual hardware platform (VHP) 171 for implementing a VM, and the VHP 171 includes a virtual hard drive 172, a virtual processor 173, virtual memory 174, a virtual video adapter 175, a virtual NIC 176, and the like. Software systems of the VMs run on each VHP in a one-to-one correspondence manner. Multiple VMs 180 run in the VM execution space 152. A guest operating system 181, and an application 185 and a display protocol agent 187 that are in a VM run in each of the VMs 180. The guest operating system 181 includes a device driver layer 182 on which a video adapter driver 183, a NIC driver 184, and the like are installed. The guest operating system 181 further includes a display application programming interface (Display API) 186.

Referring to FIG. 3 and FIG. 4, a process of displaying an image of a user desktop system on the client 101 is as follows. The application 185 in the VM 180 invokes the Display API 186 of the operating system to display an application interface, the Display API 186 transfers desktop image data of the application interface to the video adapter driver 183, then the video adapter driver 183 interacts with the display protocol agent 187, the display protocol agent 187 packages the desktop image data according to the RDP and sends the desktop image data to the NIC driver 184, and last, the desktop image data is sent to the client 101 through the virtual NIC 176 and the physical NIC 162.

Because desktop image data includes non-3D image data and 3D image data, the following two application scenarios exist, where one is an ordinary office scenario, in which transmitted desktop image data is generally non-3D image data, and the other is high-definition graphics office scenario, in which transmitted desktop image data is generally 3D image data.

The following separately introduces in detail implementation processes, in the foregoing two application scenarios, of the method for sending data in a VDI environment provided in the embodiments of the present disclosure.

Figure 5:
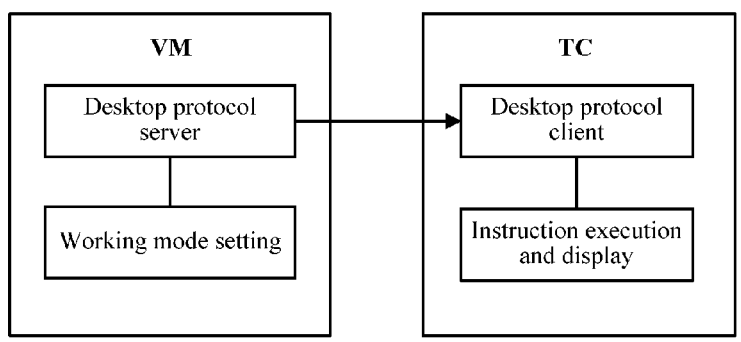
FIG. 5 is a structural diagram of system logic for implementing the foregoing method in an ordinary office scenario according to an embodiment of the present disclosure.

FIG. 5 is a structural diagram of system logic for implementing the foregoing method in an ordinary office scenario according to an embodiment of the present disclosure. In this embodiment of the present disclosure, description is made using only an interaction process between a VM and a TC as an example. In FIG. 5, a TC corresponds to a component 101a, 101b, or 101c in FIG. 3, and a desktop protocol server corresponds to a component 187 in FIG. 4. The following describes in detail functions and interaction processes of modules.

(1) Desktop Protocol Client.

The module is responsible for interacting with the desktop protocol server, receiving desktop image data sent by the desktop protocol server, and forwarding the desktop image data to an instruction execution and display module for image processing and display.

The module is further responsible for monitoring a display state of the module. When the desktop protocol client is minimized, hidden, or screen locked, the module feeds back the state to the desktop protocol server, to instruct the desktop protocol server to switch to a corresponding working mode, and when the desktop protocol client switches to normal display from the minimized state, hidden state, or screen locked state, the module also feeds back the state to the desktop protocol server, to instruct the desktop protocol server to switch to a corresponding working mode.

(2) Working Mode Setting Module.

The module receives an instruction sent by the desktop protocol server, and sets and switches a working mode of the desktop protocol server.

(3) Desktop Protocol Server.

After receiving a display instruction and data that are transferred from a video adapter driver, the module performs corresponding processing on the instruction and the data to obtain desktop image data, and then sends the desktop image data to the desktop protocol client.

Figure 6:
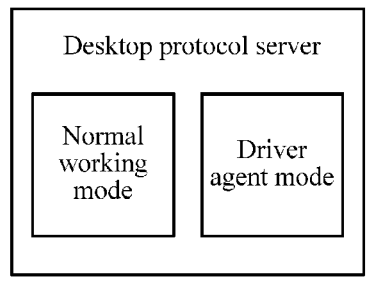
FIG. 6 is a schematic diagram of working modes of a desktop protocol server according to an embodiment of the present disclosure.

The module has two working modes. As shown in FIG. 6, in a normal working mode, work of the desktop protocol server includes performing processing such as acquisition of an instruction and data, image identification, cache calculation, and instruction integration, and sending the processed instruction and data to the desktop protocol client at a second rate (to ensure user experience, a sending period may be 30 milliseconds (ms), to ensure a refresh rate of 30 frames).

In a driver agent mode, work of the desktop protocol server includes transferring an instruction and data to a GDI subsystem for processing, acquiring a processed image for which update needs to be performed, and sending the image, for which update needs to be performed, to the desktop protocol client at a first rate (which is set according to a display delay that can be accepted by a user when display is resumed, for example, may be set to use 150 ms as a period), to reduce occupation of a CPU of a server by a VM in this case, and reduce occupied network resources.

In actual application, for example, if the first rate is a sending period of 150 ms and the second rate is a sending period of 30 ms, an effect that average CPU occupation by a single VM is reduced by 20% and bandwidth occupation by the single VM is reduced by 10% can be achieved.

Figure 7:
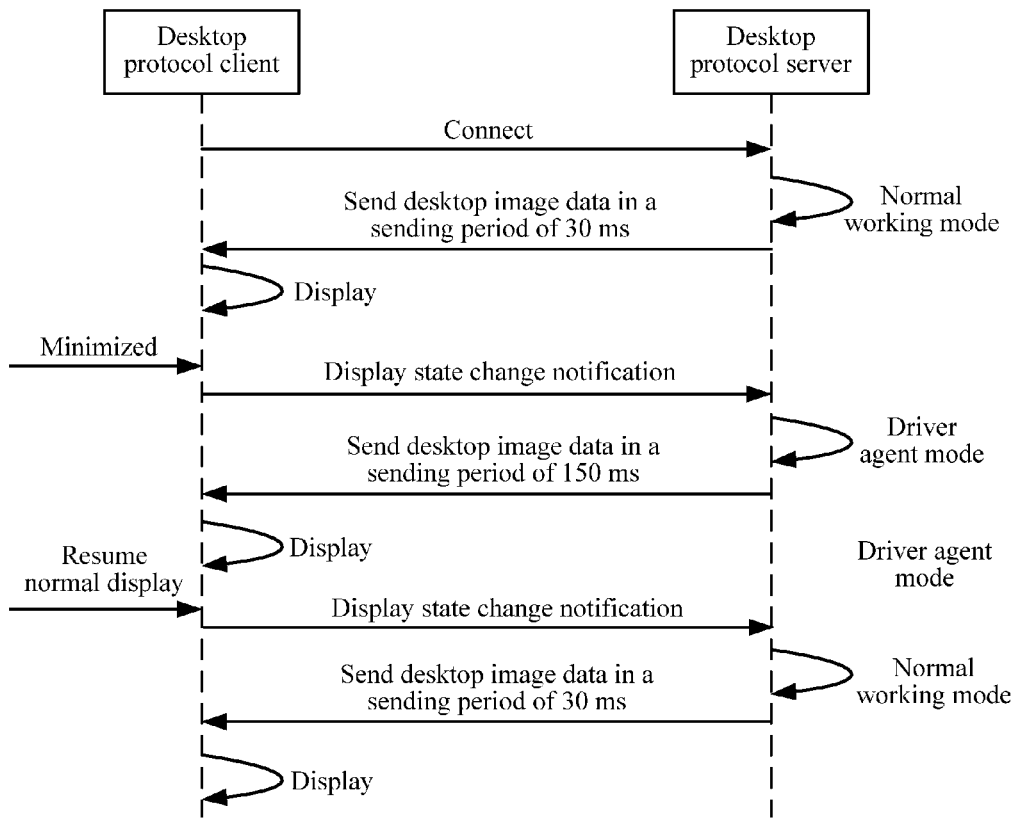
FIG. 7 is a flowchart of implementation of the foregoing method in an ordinary office scenario according to an embodiment of the present disclosure.

FIG. 7 is a flowchart of implementation of the foregoing method in an ordinary office scenario according to an embodiment of the present disclosure. A process of the implementation may include after a desktop protocol client is connected to a VM, a desktop protocol server of the VM sets a working mode to a normal working mode, and starts to perform operations such as acquisition of an instruction and data, image identification, cache calculation, and instruction integration, where in the normal working mode, obtained desktop image data is sent in a sending period of 30 ms. After receiving the desktop image data, the desktop protocol client performs desktop display. When detecting that a display state of the desktop protocol client is a minimized state, the desktop protocol client sends a state change to notify the desktop protocol server. After receiving the notification that the desktop protocol client is minimized, the desktop protocol server instructs a working mode setting module to set the working mode to a driver agent mode, where an instruction and data are transferred to a GDI subsystem of a system for processing, to acquire desktop image data, where in the driver agent mode, the obtained desktop image data is sent in a sending period of 150 ms. The desktop protocol client receives the desktop image data, and updates a displayed image. When the desktop protocol client resumes normal display, the desktop protocol client notifies the desktop protocol server of the change. After receiving the notification that the desktop protocol client resumes normal display, the desktop protocol server instructs the working mode setting module to set the working mode to the normal working mode, starts to perform operations such as acquisition of an instruction and data, image identification, cache calculation, and instruction integration, and sends obtained desktop image data to the desktop protocol client in a sending period of 30 ms, and after receiving the desktop image data, the desktop protocol client performs desktop display.

Figure 8:
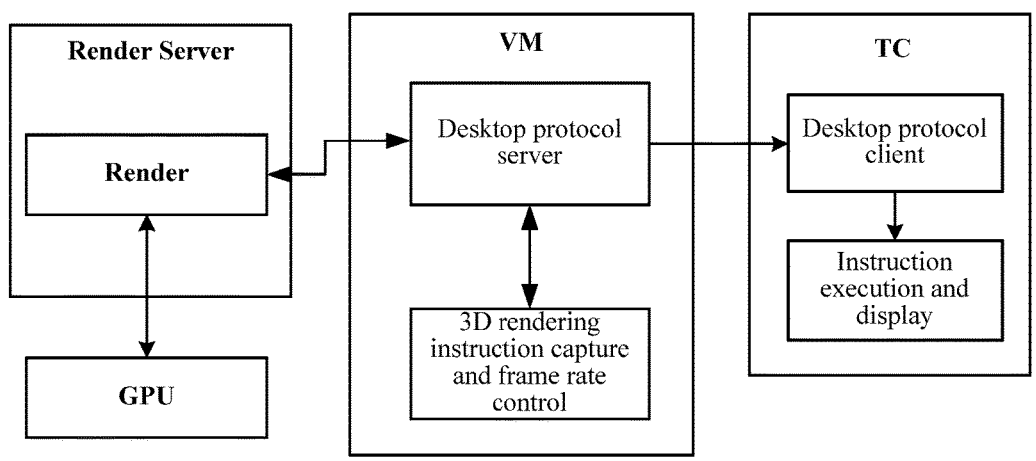
FIG. 8 is a structural diagram of system logic for implementing the foregoing method in a high-definition graphics office scenario according to an embodiment of the present disclosure.

FIG. 8 is a structural diagram of system logic for implementing the foregoing method in a high-definition graphics office scenario according to an embodiment of the present disclosure. In FIG. 8, a TC corresponds to a component 101 in FIG. 3, a desktop protocol server corresponds to a component 187 in FIG. 4, a RS corresponds to a component 109 in FIG. 3, and a render process Render_vm corresponds to a component 110 in FIG. 3. The following describes in detail functions and interaction processes of modules.

(1) Instruction and Data Capture and Frame Rate Control Module.

The module can receive a 3D rendering instruction, and redirect the 3D rendering instruction to the RS for instruction rendering. The module further supports control of a speed of acquiring a 3D rendering instruction by the desktop protocol server. For example, the speed of acquiring a 3D rendering instruction can be slowed down by reducing a rendering frame rate.

(2) Desktop Protocol Server.

After receiving a processing instruction and data that are transferred from a video adapter driver, the module redirects, through a network or a memory sharing channel of a virtualized platform is shared, the instruction and data to the RS for rendering, receives a result after rendering, and sends the result to a desktop protocol client for display.

The module further processes a message such as a connection state change or display state change of the desktop protocol client, and sets a frame rate according to a result in order to change a rendering speed of a 3D application, thereby achieving an effect of reducing occupied processing resources of a GPU in the RS.

(3) Render_vm.

The module mainly implements a function of redirecting a 3D rendering instruction to the RS for rendering: receiving a 3D rendering instruction of the desktop protocol server, and returning a result after rendering to the desktop protocol server.

(4) Desktop Protocol Client.

The module is responsible for interacting with the desktop protocol server, receiving desktop image data sent by the desktop protocol server, and forwarding the desktop image data to an instruction execution and display module for image processing and display, and is further responsible for monitoring a display state of the desktop protocol client, and sending a notification message to the desktop protocol server.

Figure 9:
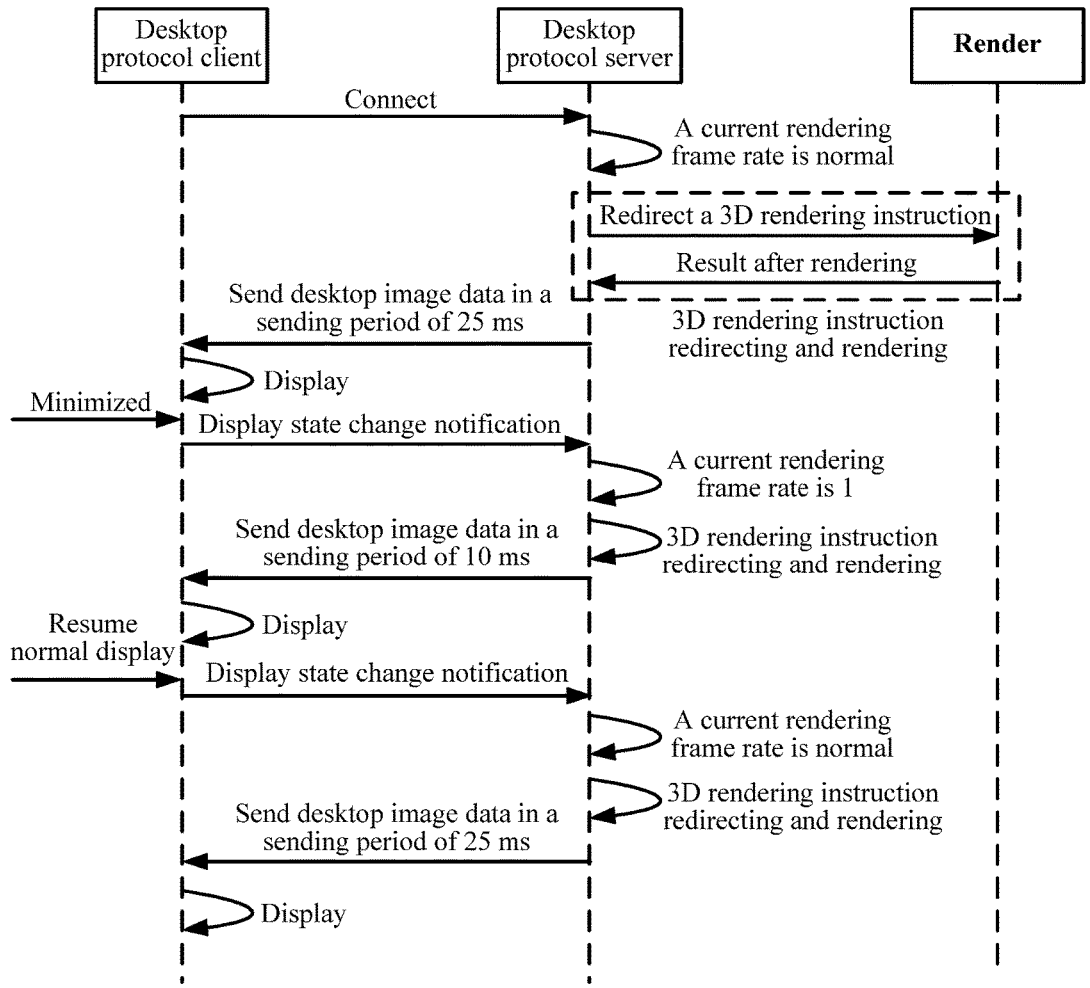
FIG. 9 is a flowchart of implementation of the foregoing method in a high-definition graphics office scenario according to an embodiment of the present disclosure.

FIG. 9 is a flowchart of implementation of the foregoing method in a high-definition graphics office scenario according to an embodiment of the present disclosure. A process of the implementation may include after a desktop protocol client is connected to a VM, a desktop protocol server of the VM sets a current rendering frame rate to a normal mode, and acquires a 3D rendering instruction. The desktop protocol server sends the acquired 3D rendering instruction to a render process on a RS through a network or a memory sharing channel of a virtualized platform, and the render process renders the 3D rendering instruction using a graphic capability of a GPU, and returns a result after rendering to the desktop protocol server. The desktop protocol server may send desktop image data obtained after rendering to the desktop protocol client at a speed of 25 frames per second, and the desktop protocol client performs desktop display. When detecting that a display state of the desktop protocol client is a minimized state, the desktop protocol client sends a state change to notify the desktop protocol server. After receiving the notification message that the client is minimized, the desktop protocol server instructs a frame rate control module to set a current rendering frame rate to 1 frame, and continues to perform 3D rendering instruction redirecting and rendering. The desktop protocol server may send desktop image data obtained after rendering to the desktop protocol client at a rate of 10 frames per second, and the desktop protocol client performs desktop display. When the desktop protocol client resumes normal display, the desktop protocol client notifies the desktop protocol server of the change. After receiving the notification that the client resumes normal display, the desktop protocol server instructs the frame rate control module to set a current rendering frame rate to normal, and continues to perform 3D rendering instruction redirecting and rendering, and the desktop protocol server may send desktop image data obtained after the rendering to the desktop protocol client at a speed of 25 frames per second, and the desktop protocol client performs desktop display.

It should be noted that, in both of the foregoing two application scenarios, the implementation process when the desktop protocol client is minimized is described. When the desktop protocol client is hidden or screen locked, the method is also implemented according to the foregoing processing process, and details are not repeated herein.

Figure 10:
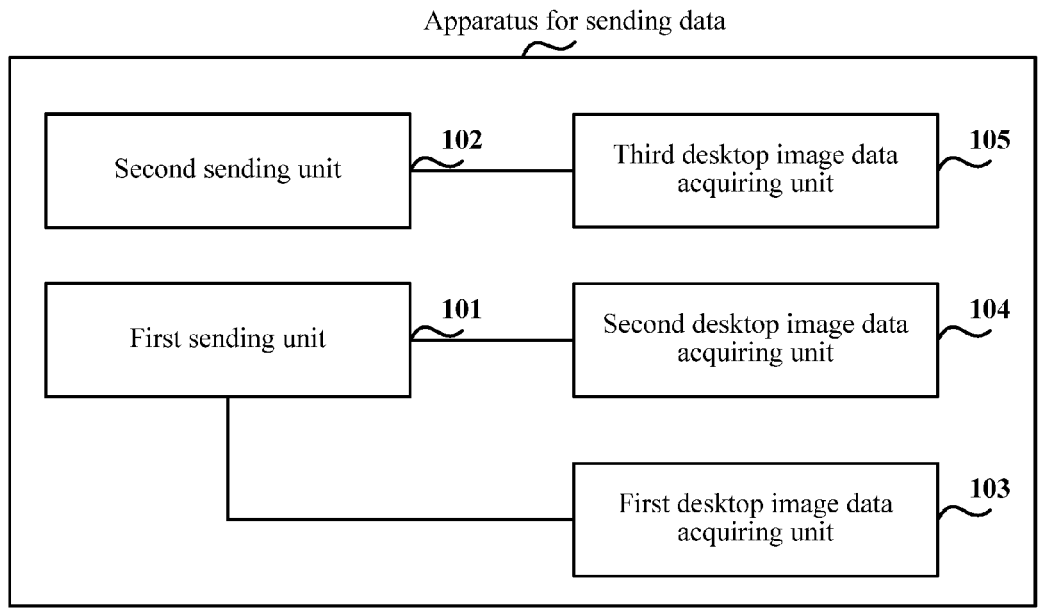
FIG. 10 is a schematic structural diagram of an apparatus for sending data in a VDI environment according to an embodiment of the present disclosure.

Based on the foregoing conception, an embodiment of the present disclosure further provides an apparatus for sending data in a VDI environment. FIG. 10 is a schematic structural diagram of the apparatus. The apparatus is used as a desktop protocol server, and may include the following units: a first sending unit 101 configured to send desktop image data acquired after the first notification message is received to the desktop protocol client at a first rate when a first notification message used for indicating that a desktop protocol client is in an abnormal state is received, where the abnormal state is a state in which the desktop protocol client does not operate, within a preset first time length, a terminal desktop on which the desktop protocol client is located, and a second sending unit 102 configured to send desktop image data acquired after the second notification message is received to the desktop protocol client at a second rate greater than the first rate when a second notification message used for indicating that the desktop protocol client is in a normal state is received, where the normal state is a state in which the desktop protocol client operates, within a preset second time length, the terminal desktop on which the desktop protocol client is located.

When the desktop image data is non-3D image data, the apparatus may further include a first desktop image data acquiring unit 103 configured to acquire the desktop image data using a GDI subsystem after the first notification message is received.

When the desktop image data is 3D image data, the apparatus may further include a second desktop image data acquiring unit 104 configured to set a current rendering frame rate to a first frame rate after the first notification message is received, where the first frame rate is less than a second frame rate used when the second notification message is received, acquire a 3D rendering instruction according to the first frame rate, and redirect the 3D rendering instruction to a RS for rendering, to obtain rendered desktop image data.

When the desktop image data is 3D image data, the apparatus may further include a third desktop image data acquiring unit 105 configured to set a current rendering frame rate to a second frame rate after the second notification message is received, where the second frame rate is greater than a first frame rate used when the first notification message is received, acquire a 3D rendering instruction according to the second frame rate, and redirect the 3D rendering instruction to a RS for rendering, to obtain rendered desktop image data.

The abnormal state may include a minimized state, a hidden state, or a screen locked state.

Figure 11:
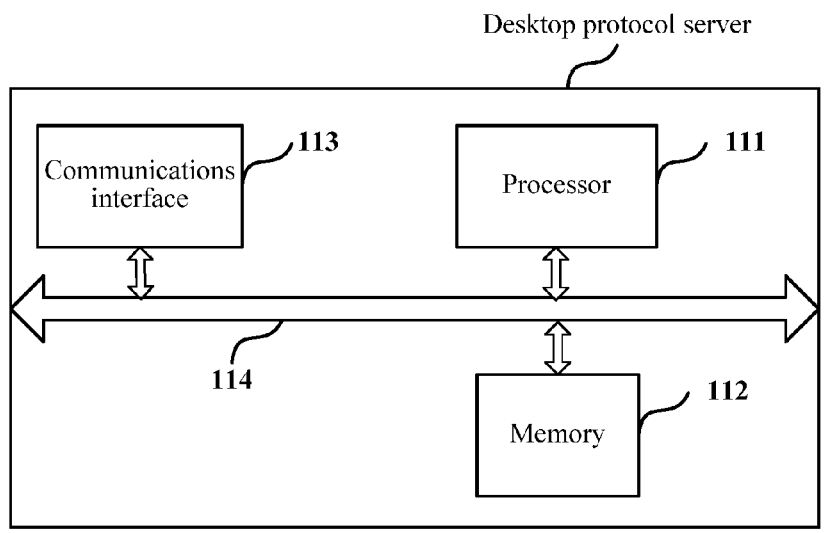
FIG. 11 is a schematic diagram of hardware logic of a desktop protocol server according to an embodiment of the present disclosure.

Correspondingly, an embodiment of the present disclosure further provides a desktop protocol server. FIG. 11 is a schematic diagram of hardware logic of the desktop protocol server, including a processor 111, a memory 112, a communications interface 113, and a bus 114.

The processor 111, the memory 112, the communications interface 113 are connected to each other using the bus 114. The bus 114 may be a peripheral component interconnect (PCI) bus, an extended industry standard architecture (EISA) bus, or the like. The bus may include an address bus, a data bus, a control bus, and the like. For ease of indication, the bus is indicated using only one bold line with double-headed arrow in FIG. 11, but it does not indicate that there is only one bus or one type of bus.

The memory 112 is configured to store a program. Further, the program may include program code, where the program code includes a computer operation instruction. The memory 112 may include a high-speed RAM, and may further include a non-volatile memory, for example, at least one magnetic disk storage.

The processor 111 executes the program stored in the memory 112, to execute a method for sending data in a VDI environment provided in an embodiment of the present disclosure, where the method includes sending, by the desktop protocol server, desktop image data acquired after the first notification message is received to the desktop protocol client at a first rate when a desktop protocol server receives a first notification message used for indicating that a desktop protocol client is in an abnormal state, where the abnormal state is a state in which the desktop protocol client does not operate, within a preset first time length, a terminal desktop on which the desktop protocol client is located, and sending, by the desktop protocol server, desktop image data acquired after the second notification message is received to the desktop protocol client at a second rate greater than the first rate when the desktop protocol server receives a second notification message used for indicating that the desktop protocol client is in a normal state, where the normal state is a state in which the desktop protocol client operates, within a preset second time length, the terminal desktop on which the desktop protocol client is located.

When the desktop image data is non-3D image data, after the first notification message is received, the desktop protocol server acquires the desktop image data in the manner of acquiring, by the desktop protocol server, the desktop image data using a GDI subsystem.

When the desktop image data is 3D image data, after the first notification message is received, the desktop protocol server acquires the desktop image data in the manner of setting, by the desktop protocol server, a current rendering frame rate to a first frame rate, where the first frame rate is less than a second frame rate used when the second notification message is received, acquiring a 3D rendering instruction according to the first frame rate, and redirecting the 3D rendering instruction to a RS for rendering, to obtain rendered desktop image data.

When the desktop image data is 3D image data, after the second notification message is received, the desktop protocol server acquires the desktop image data in the manner of setting, by the desktop protocol server, a current rendering frame rate to a second frame rate, where the second frame rate is greater than a first frame rate used when the first notification message is received, acquiring a 3D rendering instruction according to the second frame rate, and redirecting the 3D rendering instruction to a RS for rendering, to obtain rendered desktop image data.

The abnormal state includes a minimized state, a hidden state, or a screen locked state.

In a VDI environment, the desktop protocol client is located in a virtual desktop client, and the desktop protocol server is located on a VM in a virtual desktop server, where the desktop protocol server sends the acquired desktop image data to the desktop protocol client in the virtual desktop client using an operating system in the VM and a physical NIC in the virtual desktop server.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for sending data in a visual desktop infrastructure (VDI) environment, comprising:
   receiving, by a desktop protocol server, a first notification message indicating that a desktop protocol client is in an abnormal state, the abnormal state comprising a state in which the desktop protocol client does not operate, within a preset first time length, a terminal desktop on which the desktop protocol client is located;
   upon reception of the first notification message, operating, by the desktop protocol server, in a driver agent mode, the driver agent mode corresponding to a first sending period of sending the desktop image data to the desktop protocol client;
   sending, by the desktop protocol server, desktop image data acquired after the first notification message is received to the desktop protocol client at a first rate;
   receiving, by the desktop protocol server, a second notification message indicating that the desktop protocol client is in a normal state, the normal state comprising another state in which the desktop protocol client operates, within a preset second time length, the terminal desktop on which the desktop protocol client is located;
   upon reception of the second notification message, operating, by the desktop protocol server, in a working mode, the working mode corresponding to a second sending period of sending the desktop image data to the desktop protocol client, the first sending period and the second sending period both being greater than zero seconds, and the first sending period being greater than the second sending period; and
   sending, by the desktop protocol server, desktop image data acquired after the second notification message is received to the desktop protocol client at a second rate, wherein the second rate is greater than the first rate.

2. The method of claim 1, wherein the desktop image data is non-three dimensional (3D) image data, and after receiving the first notification message, the desktop protocol server acquires the desktop image data in the manner of acquiring, by the desktop protocol server, the desktop image data using a graphics device interface (GDI) subsystem.

3. The method of claim 1, wherein the desktop image data is three dimensional (3D) image data, and after receiving the first notification message, the desktop protocol server acquires the desktop image data in the following manner:
   setting, by the desktop protocol server, a current rendering frame rate to a first frame rate, the first frame rate being less than a second frame rate used when the second notification message is received;
   acquiring a 3D rendering instruction according to the first frame rate; and
   redirecting the 3D rendering instruction to a render server for rendering, to obtain rendered desktop image data.

4. The method of claim 1, wherein the desktop image data is three dimensional (3D) image data, and after receiving the second notification message, the desktop protocol server acquires the desktop image data in the following manner:
   setting, by the desktop protocol server, a current rendering frame rate to a second frame rate, the second frame rate being greater than a first frame rate used when the first notification message is received;
   acquiring a 3D rendering instruction according to the second frame rate; and
   redirecting the 3D rendering instruction to a render server for rendering, to obtain rendered desktop image data.

5. The method of claim 1, wherein the abnormal state comprises a minimized state.

6. The method of claim 1, wherein the abnormal state comprises a hidden state.

7. The method of claim 1, wherein the abnormal state comprises a screen locked state.

8. The method of claim 1, wherein in the VDI environment, the desktop protocol client is located in a virtual desktop client, the desktop protocol server is located on a virtual machine in a virtual desktop server, and the desktop protocol server is configured to send the acquired desktop image data to the desktop protocol client in the virtual desktop client using an operating system in the virtual machine and a physical network interface card in the virtual desktop server.

9. The method of claim 1, wherein the working mode comprises the desktop protocol server performing image identification, cache calculation, and instruction integration, the driver agent mode comprises the desktop protocol server not performing image identification, cache calculation, and instruction integration, the first sending period being 150 milliseconds (ms) and the second sending period being 30 ms when the desktop image data is non-three dimensional (3D) image data, and the first sending period being 100 ms and the second period being 40 ms when the desktop image data is 3D image data.

10. An apparatus for sending data in a visual desktop infrastructure (VDI) environment, the apparatus being configured to use as a desktop protocol server, and the apparatus comprising:

a processor; and a memory coupled to the processor, the memory comprising a plurality of instructions stored thereon, that when executed by the processor, cause the processor to:

receive a first notification message indicating that a desktop protocol client is in an abnormal state, the abnormal state comprising a state in which the desktop protocol client does not operate, within a preset first time length, a terminal desktop on which the desktop protocol client is located;

upon reception of the first notification message, operate in a driver agent mode, the driver agent mode corresponding to a first sending period of sending the desktop image data to the desktop protocol client;

send desktop image data acquired after the first notification message is received to the desktop protocol client at a first rate;

receive a second notification message indicating that the desktop protocol client is in a normal state, the normal state comprising another state in which the desktop protocol client operates, within a preset second time length, the terminal desktop on which the desktop protocol client is located;

upon reception of the second notification message, operate in a working mode, the working mode corresponding to a second sending period of sending the desktop image data to the desktop protocol client, the first sending period and the second sending period both being greater than zero seconds, and the first sending period being greater than the second sending period; and send desktop image data acquired after the second notification message is received to the desktop protocol client at a second rate, wherein the second rate is greater than the first rate.

11. The apparatus of claim 10, wherein the desktop image data is non-three dimensional (3D) image data, and the instructions further cause the processor of the apparatus to acquire the desktop image data using a graphics device interface (GDI) subsystem after the first notification message is received.

12. The apparatus of claim 10, wherein the desktop image data is three dimensional (3D) image data, and the instructions further cause the processor of the apparatus to:

set a current rendering frame rate to a first frame rate after the first notification message is received, the first frame rate being less than a second frame rate used when the second notification message is received;

acquire a 3D rendering instruction according to the first frame rate; and redirect the 3D rendering instruction to a render server for rendering, to obtain rendered desktop image data.

13. The apparatus of claim 10, wherein the desktop image data is three dimensional (3D) image data, and the instructions further cause the processor of the apparatus to:

set a current rendering frame rate to a second frame rate after the second notification message is received, the second frame rate being greater than a first frame rate used when the first notification message is received;

acquire a 3D rendering instruction according to the second frame rate; and redirect the 3D rendering instruction to a render server for rendering, to obtain rendered desktop image data.

14. The apparatus of claim 10, wherein the abnormal state comprises a minimized state, a hidden state, or a screen locked state.

15. The apparatus of claim 10, wherein in the VDI environment, the desktop protocol client is located in a virtual desktop client, the desktop protocol server is located on a virtual machine in a virtual desktop server, and the instructions further cause the processor of the apparatus to send the acquired desktop image data to the desktop protocol client in the virtual desktop client using an operating system in the virtual machine and a physical network interface card in the virtual desktop server.

16. A computer program product, comprising a non-transitory computer-readable medium configured to store computer executable instructions that when executed by a processor of a desktop protocol server, instruct the processor to:

receive a first notification message indicating that a desktop protocol client is in an abnormal state, the abnormal state comprising a state in which the desktop protocol client does not operate, within a preset first time length, a terminal desktop on which the desktop protocol client is located;

upon reception of the first notification message, operate in a driver agent mode, the driver agent mode corresponding to a first sending period of sending the desktop image data to the desktop protocol client;

send desktop image data acquired after the first notification message is received to the desktop protocol client at a first rate;

receive a second notification message indicating that the desktop protocol client is in a normal state, the normal state comprising another state in which the desktop protocol client operates, within a preset second time length, the terminal desktop on which the desktop protocol client is located;

upon reception of the second notification message, operate in a working mode, the working mode corresponding to a second sending period of sending the desktop image data to the desktop protocol client, the first sending period and the second sending period both being greater than zero seconds, and the first sending period being greater than the second sending period; and send desktop image data acquired after the second notification message is received to the desktop protocol client at a second rate, wherein the second rate is greater than the first rate.

17. The computer program product of claim 16, wherein the desktop image data is non-three dimensional (3D) image data, and the instructions further cause the processor of the desktop protocol server to acquire the desktop image data using a graphics device interface (GDI) subsystem after the first notification message is received.

18. The computer program product of claim 16, wherein the desktop image data is three dimensional (3D) image data, and the instructions further cause the processor of the desktop protocol server to:

set a current rendering frame rate to a first frame rate after the first notification message is received, the first frame rate being less than a second frame rate used when the second notification message is received;

acquire a 3D rendering instruction according to the first frame rate; and redirect the 3D rendering instruction to a render server for rendering, to obtain rendered desktop image data.

19. The computer program product of claim 16, wherein the desktop image data is three dimensional (3D) image data, and the instructions further cause the processor of the desktop protocol server to:

set a current rendering frame rate to a second frame rate after the second notification message is received, the second frame rate bin g greater than a first frame rate used when the first notification message is received;

acquire a 3D rendering instruction according to the second frame rate; and redirect the 3D rendering instruction to a render server for rendering, to obtain rendered desktop image data.

20. The computer program product of claim 16, wherein the abnormal state comprises a minimized state, a hidden state, or a screen locked state.

21. The computer program product of claim 16, wherein in the VDI environment, the desktop protocol client is located in a virtual desktop client, the desktop protocol server is located on a virtual machine in a virtual desktop server, and the instructions further cause the processor of the desktop protocol server to send the acquired desktop image data to the desktop protocol client in the virtual desktop client using an operating system in the virtual machine and a physical network interface card in the virtual desktop server.

* * * * *

UNITED STATES PATENT AND TRADEMARK OFFICE
CERTIFICATE OF CORRECTION

PATENT NO. : 10,110,662 B2
APPLICATION NO. : 15/192336
DATED : October 23, 2018
INVENTOR(S) : Zhimin Jiang and Xibao Pang It is certified that error appears in the above-identified patent and that said Letters Patent is hereby corrected as shown below:

On the Title Page

Item (30) Foreign Application Priority Data section should read:
Dec. 26, 2013   (CN) .......................... 201310733699.8

In the Claims

Column 17, Line 3, Claim 19 should read:
second frame rate *being* greater than a first frame rate Signed and Sealed this
Fourth Day of December, 2018

Andrei Iancu
*Director of the United States Patent and Trademark Office*